A. H. SMITH.
SAFETY GUARD FOR EYEGLASS CASES, WALLETS, &c.
APPLICATION FILED MAY 15, 1916.

1,265,824.

Patented May 14, 1918.

Inventor
Albert H. Smith

Witnesses
H. W. Burton

W. W. Williamson
Attorney

UNITED STATES PATENT OFFICE.

ALBERT H. SMITH, OF DARBY, PENNSYLVANIA.

SAFETY-GUARD FOR EYEGLASS-CASES, WALLETS, &c.

1,265,824.  Specification of Letters Patent.  Patented May 14, 1918.

Application filed May 15, 1916. Serial No. 97,470.

*To all whom it may concern:*

Be it known that I, ALBERT H. SMITH, a citizen of the United States, residing at Darby, in the county of Delaware and State of Pennsylvania, have invented new and useful Improvements in Safety-Guards for Eyeglass-Cases, Wallets, &c., of which the following is a specification.

My invention relates to new and useful improvements in safety guards for eyeglass cases, wallets and other similar objects, and has for its object to provide an exceedingly simple and effective device of this character whereby such articles will not be accidentally lost or displaced from the pocket of the owner, but they can be readily removed when desired.

A further object of the invention is to provide a safety guard which may be readily and quickly attached or detached from the article or object on which it is used.

A still further object of the invention is to provide an elastic member in the form of a strip or band, portions thereof having projections formed integral therewith and in the form of corrugations or arcuate ridges, said projections adapted to contact with the walls of the pocket in which the object carrying the safety guard is placed, the friction caused by said contact being sufficient to prevent the accidental displacement or loss of the article.

With these ends in view, my invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this application, in which—

Figure 1:
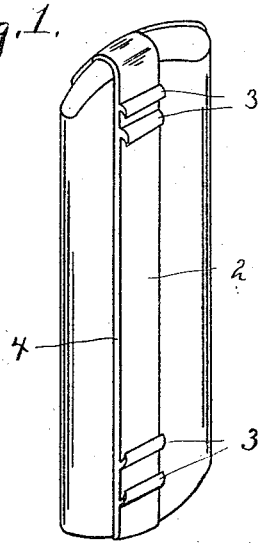
Figure 1, is a perspective view of my improved safety guard showing it applied to the object or article, said article in this case being represented as an eyeglass case.
Figure 2:
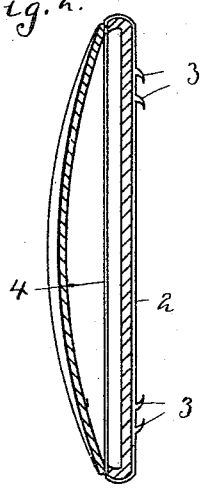
Fig. 2, is a section at the line 2—2 of Fig. 1.

In carrying out my invention as here embodied 2 represents my improved safety guard comprising as shown in Figs. 1 and 2 an endless band or body 4 of suitable elastic material such as rubber, and on the portion of the band which is always on the outside of the article to which it is attached, said band is provided with integral projections 3 in the form of ridges running transversely thereof, and these ridges are preferably arranged in sets consisting of two or more projections.

As shown in Figs. 1 to 4 these ridges or projections are formed arcuate in shape and the ridges of the two sets illustrated project in opposite directions so that no matter which end of the article carrying the safety guard is first placed in the pocket, one set of ridges or projections will always project outwardly and contact with the walls of the pocket, thereby preventing the accidental displacement or loss of the article because of the friction produced between the projections and the walls of the pocket. The ridges or projections of one set project toward those of the other set.

These ridges or projections being formed of rubber or other suitable soft, elastic and compressible material will permit said ridges to be bent backward as the article is being drawn from the pocket, thereby greatly reducing the friction between the parts and permitting the ready withdrawal of the article. The safety guard may be attached to any article by placing the same around said article or some suitable portion of said article, or it may be placed between parts of an article as in the case of an eyeglass case or holder, such as illustrated in Figs. 1 and 2, and when applied as shown therein the rubber band is placed around the ends of the body of the eyeglass case and the cover closed thereon.

Figure 3:
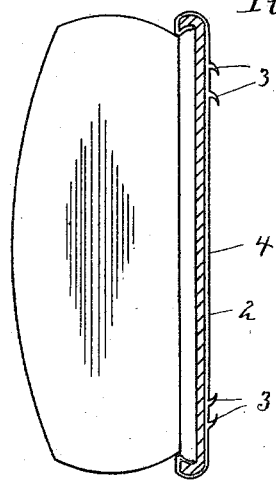
Fig. 3, is a similar view showing the covering of the casing open and illustrating a slightly modified form of my invention.

In Fig. 3 I have shown the body or attaching member 4 in the form of a strip of suitable elastic material such as rubber, the ends thereof being fastened to the article in some suitable manner as by cement or rivets.

Figure 4:
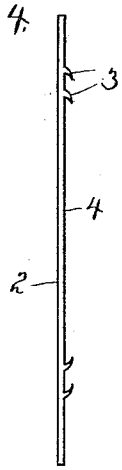
Fig. 4, is an edge view of another form of my invention.

In Fig. 4 I have shown the body or attaching member 4 in the form of a strip of material and this may be made of elastic material or some other stiffer substance and may be applied entirely to the outside of the article to which it is to be attached in some suitable manner as by cement or rivets.

Figure 5:
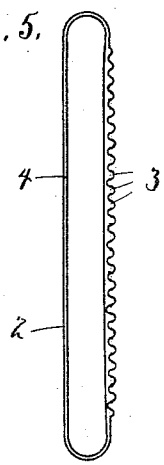
Fig. 5, is an edge view of a safety guard similar to that illustrated in Figs. 1 and 2, but having a slightly different arrangement of projections.

In Fig. 5 I have shown the safety guard in the form of an endless band, but the projections are in the form of transverse corrugations formed integral therewith and running through out approximately one half of the entire band.

I do not wish to be limited to the exact amount of surface of the band so corrugated, as a smaller number of corrugations may be formed than here illustrated, or the entire outside face of the band may be corrugated but the idea is to corrugate a sufficient amount of the outside surface of the band so that when an article carrying the safety guard is placed in the pocket, said corrugations will engage the walls of the pocket and prevent the accidental displacement or loss of the article.

Figure 6:
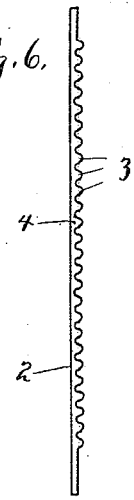
Fig. 6, is a similar view of still another form of my invention.

In Fig. 6 I have shown a form of my invention similar to that illustrated in Fig. 4 with the exception that the projections are in the form of transverse corrugations instead of transverse arcuate ridges.

In practice the safety guard is placed upon the article when it is desired to protect against loss, and said article is then placed in the pocket in the ordinary manner, at which time the projections will frictionally engage the walls of the pocket and prevent the accidental displacement or loss of said article.

Of course I do not wish to be limited to the exact details of construction as herein shown as these may be varied within the limits of the appended claims without departing from the spirit of my invention.

Having thus fully described my invention, what I claim as new and useful is—

1. A safety guard comprising an endless elastic band having integral arcuate projections arranged in sets, the projections of one set extending in the direction opposite to the direction of the other set.

2. A safety guard comprising a body provided with transverse projections or ridges arcuate in cross section, some of said projections extending in one direction and the others in the opposite direction.

3. A safety guard comprising a body of elastic material having integral transverse projections formed therewith, some of said projections extending in one direction and the others in the opposite direction.

In testimony whereof, I have hereunto affixed my signature in the presence of a subscribing witness.

ALBERT H. SMITH.

Witness:
  MOLLIE TOBIAS.

Copies of this patent may be obtained for five cents each, by addressing the "Commissioner of Patents, Washington, D. C."